(12) United States Patent
Krasnoiarov

(10) Patent No.: US 8,601,452 B2
(45) Date of Patent: Dec. 3, 2013

(54) COMPILER FOR JAVA AND .NET

(75) Inventor: Boris Krasnoiarov, El Cerrito, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1201 days.

(21) Appl. No.: 12/019,421

(22) Filed: Jan. 24, 2008

(65) Prior Publication Data

US 2008/0216063 A1 Sep. 4, 2008

Related U.S. Application Data

(60) Provisional application No. 60/892,765, filed on Mar. 2, 2007.

(51) Int. Cl.
*G06F 9/45* (2006.01)
*G06F 9/44* (2006.01)

(52) U.S. Cl.
USPC .................. 717/146; 717/147; 717/162

(58) Field of Classification Search
None
See application file for complete search history.

(56) References Cited

U.S. PATENT DOCUMENTS

| | | | | |
|---|---|---|---|---|
| 4,667,290 A * | 5/1987 | Goss et al. | | 717/147 |
| 5,659,753 A * | 8/1997 | Murphy et al. | | 717/147 |
| 5,836,014 A * | 11/1998 | Faiman, Jr. | | 717/147 |
| 6,128,011 A * | 10/2000 | Peng | | 715/744 |
| 6,317,870 B1 * | 11/2001 | Mattson, Jr. | | 717/162 |
| 6,708,330 B1 * | 3/2004 | Moberg et al. | | 717/162 |
| 7,213,236 B2 * | 5/2007 | Gibbons | | 717/136 |
| 7,325,230 B2 * | 1/2008 | Uchida | | 717/140 |
| 7,380,242 B2 * | 5/2008 | Alaluf | | 717/148 |
| 7,493,602 B2 * | 2/2009 | Jaeger et al. | | 717/137 |
| 7,493,605 B2 * | 2/2009 | Alaluf et al. | | 717/148 |
| 7,543,270 B1 * | 6/2009 | Grace | | 717/137 |
| 7,559,050 B2 * | 7/2009 | Burger | | 717/106 |
| 7,562,349 B2 * | 7/2009 | Fleischer et al. | | 717/122 |
| 7,716,655 B2 * | 5/2010 | Uchida | | 717/140 |
| 7,770,158 B2 * | 8/2010 | Osborne et al. | | 717/137 |
| 7,844,958 B2 * | 11/2010 | Colton et al. | | 717/146 |
| 8,006,237 B2 * | 8/2011 | Souloglou et al. | | 717/146 |
| 8,079,023 B2 * | 12/2011 | Chen | | 717/146 |
| 8,291,401 B2 * | 10/2012 | Gray et al. | | 717/162 |
| 8,359,575 B2 * | 1/2013 | Wilner et al. | | 717/162 |
| 8,423,953 B2 * | 4/2013 | Colton et al. | | 717/146 |
| 8,443,349 B2 * | 5/2013 | Papakipos et al. | | 717/147 |
| 2005/0114848 A1 * | 5/2005 | Choi et al. | | 717/148 |
| 2007/0067759 A1 * | 3/2007 | Uchida | | 717/140 |
| 2007/0169026 A1 * | 7/2007 | Davis | | 717/162 |
| 2008/0235675 A1 * | 9/2008 | Chen | | 717/147 |

OTHER PUBLICATIONS

Bishop, et al., "Experience in integrating Java with C# and .NET", 2003, Concurrency and Computation: Practice and Experience; [retrieved on Oct. 11, 2011]; Retrieved from Internet <URL:http://www.cs.uvic.ca/~nigelh/Publications/ccpe03.pdf>;pp. 1-19.*

(Continued)

*Primary Examiner* — Thuy Dao
*Assistant Examiner* — Xi D Chen
(74) *Attorney, Agent, or Firm* — Kilpatrick Townsend & Stockton LLP

(57) ABSTRACT

A computer implemented method analyzing a first code in a first managed computer language and generating intermediate code in a completed language. The intermediate code into linking code that allows the second code in a second managed runtime language to interact with the first code.

13 Claims, 3 Drawing Sheets

(56) References Cited

OTHER PUBLICATIONS

Goo, "JaCIL: A CLI to JVM Compiler Technical Report", 2006, Rochester Institute of Technology, Department of Computer Science; [retrieved on Jan. 22, 2013]; Retrieved from Internet <URL:http://ritdml.rit.edu/bitstream/handle/1850/2763/AGooThesis2006.pdf?sequence=2>; pp. 1-89.*

Zdun, "Some Patterns of Component and Language Integration", In Proceedings of 9th European Conference on Pattern Languages of Programs (EuroPloP'04); [retrieved on May 29, 2013]; Retrieved from Internet <URL:http://nm.wu-wien.ac.at/research/publications/b486.pdf>;pp. 1-27.*

Thorn, "Programming Languages for Mobile Code"; 1997 ACM; [retrived on Aug. 8, 2013]; Retrieved from Internet <URL:http://dl.acm.org/citation.cfm?id=262009>; pp. 213-239.*

Henzinger, Kirsch, "The Embedded Mahine: Predicatable, Portable Real-Time Code": 2002 ACM; [retrived on Aug. 8, 2013]; Retrieved from Internet <URL:http://dl.acm.org/citation.cfm?id=51259>; pp. 315-326.*

Ossher, et al., "SourcererDB: An Aggregated Repository of Statically Analyzed and Cross-Linked Open Source Java Projects"; 2009 IEEE; [retrived on Aug. 8, 2013]; Retrieved from Internet <URL:http://ieeexplore.ieee.org/stamp/stamp.jsp?tp=&arnumber=5069501>;pp. 183-186.*

Sneeed, et al., "Linking Legacy Services to the Business Process Model", 2012 IEEE; [retrieved on Aug. 8, 2013]; Retrived from Internet <URL:http://ieeexplore.ieee.org/stamp/stamp.jsp?tp=&arnumber=6392601>; pp. 17-26.*

* cited by examiner

COMPILER FOR JAVA AND .NET

CLAIM OF PRIORITY

This application claims priority to U.S. Provisional Application No. 60/892,765 entitled "COMPILER FOR JAVA AND .NET", filed Mar. 2, 2007, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

JAVA and .Net are both popular managed runtime languages. Both languages provide powerful libraries that provide useful functionality.

It is often desired to have access to the functionality of a .Net library from a JAVA program or to the functionality of a JAVA library from a .Net program. One way to do this is to access the library using a web service. This may be too bulky or slow in some situations.

DETAILED DESCRIPTION

Embodiments of the present invention include processing managed runtime language code to produce intermediate code, such as C++ code, and converting this intermediate code to linking code. The linking code can be used to allow code in another managed runtime language to access the first managed runtime language code. For example, a .Net library can be analyzed to produce linking code for a JAVA program to access the .Net library.

Figure 1A:
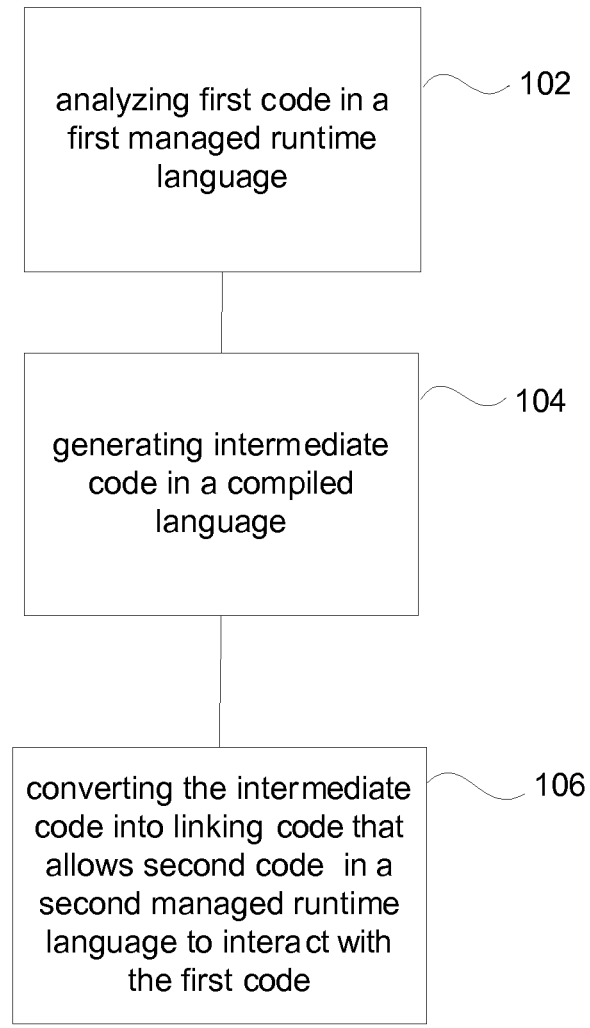
FIGS. 1A-1C are diagrams that illustrate a system and method of one embodiment.

One embodiment of the present invention includes a computer implemented method shown in FIG. 1A. In step 102, first code in a first managed runtime language is analyzed. In step 104, intermediate code in a compiled language, such as C or C++, is generated. In step 106, the intermediate code is converted into linking code that allows second code in a second managed runtime language to interact with the first code.

Figure 1B:
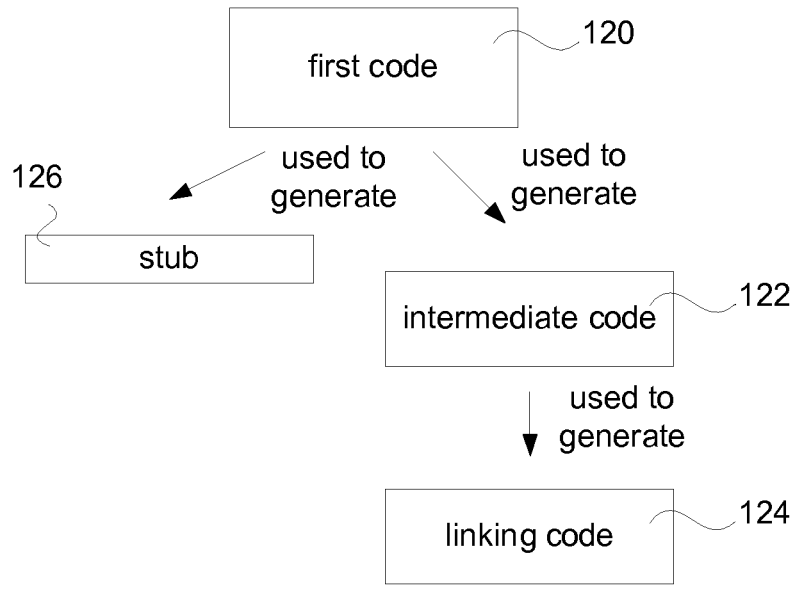
Figure 1C:
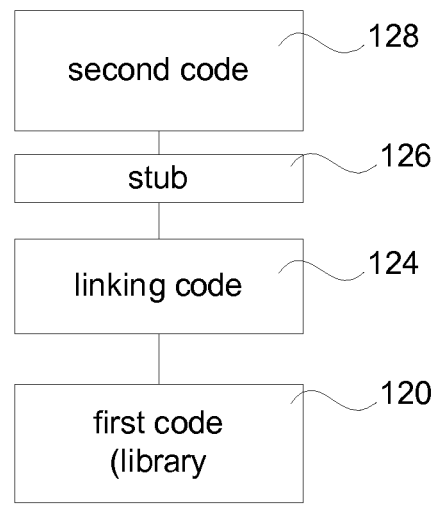

FIG. 1B an example where first code 120 in a first managed code language is used to produce intermediate code 122. The intermediate code 122 can be analyzed to produce linking code 124. In one embodiment, the first code 120 can also be analyzed to produce stubs 126 in a second managed runtime language. FIG. 1C shows an example with second code 128 using stubs 126 and linking code 124 to access first code 120. In this way, the second code 128 can access the functionality of the first code that is in another managed runtime language.

The first managed runtime language can be .Net and the second managed runtime language can be JAVA or vice versa.

In one embodiment, first code 120 is a .Net library. The first code can be .Net assembly code and a JAVA stub 126 can be generated based on the .Net assembly code. The JAVA stub 126 can connect to linking code 124. The linking code 124 can be mixed mode assembly code.

Figure 2A:
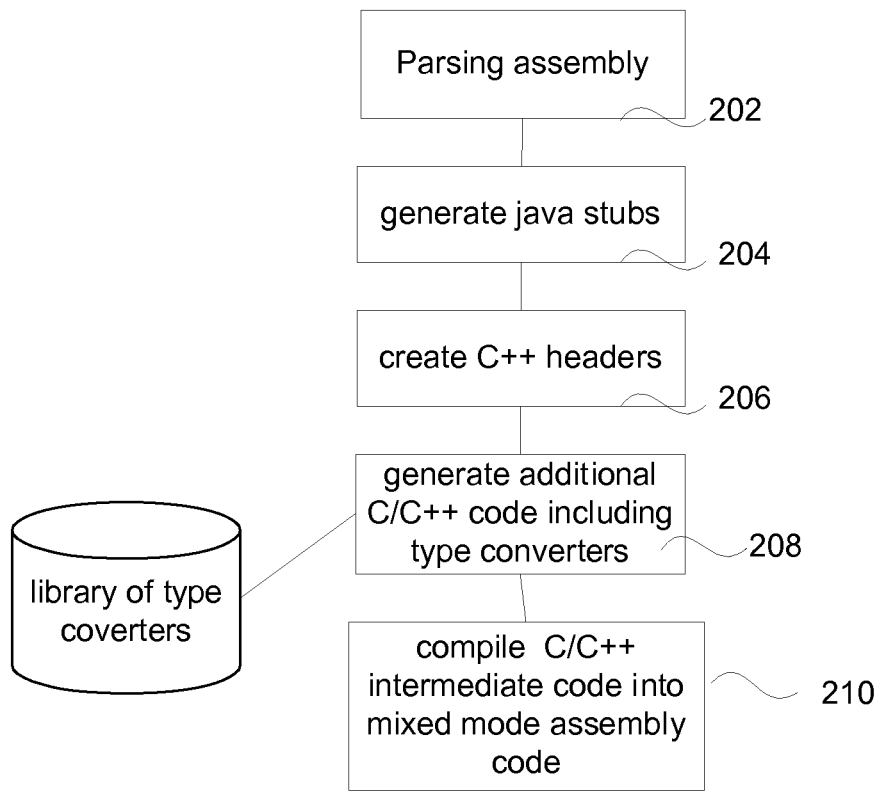
FIGS. 2A-2B illustrate the creation of code to link from a JAVA program to a .Net library.
Figure 2B:
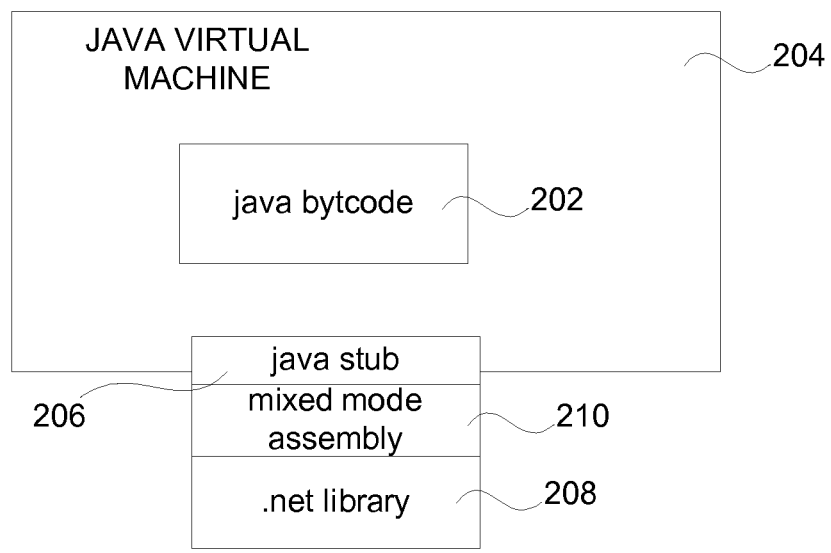

FIGS. 2A-2B illustrates details of one embodiment. Looking at FIG. 2A, in step 202, .Net assembly language code can be parsed. In step 204, a JAVA stub can be generated based on the .Net assembly language code. In one embodiment, the JAVA stub is a java file. In step 208, intermediate language linking code based on the .Net assembly language code can be generated. The intermediate language linking code can be mixed mode assembly code. In one embodiment, the JAVA stub is a JAVA file. In step 206, a JAVAH tool can create headers in the intermediate language. The headers can be filed in with type converters from a library of type converters 208. The type converters can be segments of code to convert data of a type in one language into a type in another language.

For example, the type converters can convert input to a .Net library from a JAVA format to a .Net format, and outputs from a .Net format to a JAVA format. The intermediate code, such as C or C++ code in a .ccp file including the headers and type converters, can be converted into .dll mixed mode assembly code.

FIG. 2B shows an example where JAVA bytecode 202 running in a Java Virtual Machine (JVM) 204 can use JAVA stubs 206 to access a .Net library through the mixed mode assembly code 210. The mixed mode assembly code 210 can be a .NET assembly, which can contain both managed code and unmanaged code.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A computer implemented method comprising:
    analyzing first code in a first language that is executable in a first managed runtime environment;
    generating one or more stubs in a second language that is executable in a second managed runtime environment, wherein the one or more stubs are generated based on the analyzed first code;
    generating intermediate code in a high-level language based on the analyzed first code;
    converting the intermediate code into linking code so that the linking code allows second code in the second language that is executable in the second managed runtime environment, but is not executable in the first managed runtime environment, to interact with the first code that is executable in the first managed runtime environment, wherein the converting the intermediate code into the linking code comprises:
        generating additional code comprising one or more type converters to convert:
            an input in the second language to an input in the first language; and
            an output in the first language to an output in the second language;
        adding the additional code comprising the one or more type converters into the intermediate code so that the intermediate code includes the one or more type converters; and
        compiling the intermediate code into mixed mode assembly code;
    configuring the one or more stubs in the second language and the linking code to allow access between the second code in the second language and the first code in the first language, wherein the configuring comprises:
        linking the one or more stubs in the second language to the linking code; and
        linking the second code in the second language to the linking code; and
    executing a program that includes the second code in the second managed runtime environment, wherein executing the program comprises using the one or more stubs in the second language to access the first code in the first language through the linking code;
    wherein the first code is executed in the first managed runtime environment.

2. The computer implemented method of claim 1, wherein the first managed runtime environment is an assembly language code runtime environment.

3. The computer implemented method of claim 1, wherein the second managed runtime environment is a JAVA runtime environment.

4. The computer implemented method of claim 1, wherein the first code is an assembly language code library.

5. The computer implemented method of claim 1, wherein the first code is assembly language code and wherein the one or more stubs comprise a JAVA stub that is generated based on the assembly language code.

6. The computer implemented method of claim 1, wherein the intermediate code is in C++.

7. A computer readable memory having stored therein a sequence of instructions which, when executed by a processor, cause the processor to:
    analyze first code in a first language that is executable in a first managed computer environment;
    generate one or more stubs in a second language that is executable in a second managed computer environment, wherein the one or more stubs are generated based on the analyzed first code;
    generate intermediate code in a high-level language based on the analyzed first code;
    convert the intermediate code into linking code so that the linking code allows second code in the second language that is executable in the second managed computer environment, but is not executable in the first managed computer environment, to interact with the first code that is executable in the first managed computer environment, wherein the converting the intermediate code into linking code comprises:
        generating additional code comprising one or more type converters to convert:
            an input in the second language to an input in the first language; and
            an output in the first language to an output in the second language;
        adding the additional code comprising the one or more type converters into the intermediate code so that the intermediate code includes the one or more type converters; and
        compiling the intermediate code into mixed mode assembly code;
    configure the one or more stubs in the second language and the linking code to allow access between the second code in the second language and the first code in the first language, wherein the configuring comprises:

linking the one or more stubs in the second language to the linking code; and linking the second code in the second language to the linking code; and executing a program that includes the second code in the second managed runtime environment, wherein executing the program comprises using the one or more stubs in the second language to access the first code in the first language through the linking code;

wherein the first code is executed in the first managed runtime environment.

8. The computer readable memory of claim 7, wherein the first managed runtime environment is assembly language code runtime environment.

9. The computer readable memory of claim 7, wherein the second managed runtime environment is a JAVA runtime environment.

10. The computer readable memory of claim 7, wherein the first code is an assembly language code library.

11. The computer readable memory of claim 7, wherein the first code is assembly language code and wherein the one or more stubs comprise a JAVA stub that is generated based on the assembly language code.

12. The computer readable memory of claim 7, wherein the intermediate code is in C++.

13. A system comprising:

a processor; and a memory coupled with and readable by the processor, having stored therein a sequence of instructions which, when executed by the processor, causes the processor to:

analyze first code in a first language that is executable in a first managed computer environment;

generate one or more stubs in a second language that is executable in a second managed computer environment, wherein the one or more stubs are generated based on the analyzed first code;

generate intermediate code in a high-level language based on the analyzed first code;

convert the intermediate code into linking code so that the linking code allows second code in the second language that is executable in the second managed computer environment, but is not executable in the first managed computer environment, to interact with the first code that is executable in the first managed computer environment, wherein the converting the intermediate code into linking code comprises:

generating additional code comprising one or more type converters to convert:

an input in the second language to an input in the first language; and an output in the first language to an output in the second language;

adding the additional code comprising the one or more type converters into the intermediate code so that the intermediate code includes the one or more type converters; and compiling the intermediate code into mixed mode assembly code;

configure the one or more stubs in the second language and the linking code to allow access between the second code in the second language and the first code in the first language, wherein the configuring comprises:

linking the one or more stubs in the second language to the linking code; and linking the second code in the second language to the linking code; and execute a program that includes the second code in the second managed runtime environment, wherein executing the program comprises using the one or more stubs in the second language to access the first code in the first language through the linking code;

wherein the first code is executed in the first managed runtime environment.

* * * * *

UNITED STATES PATENT AND TRADEMARK OFFICE
CERTIFICATE OF CORRECTION

PATENT NO. : 8,601,452 B2  
APPLICATION NO. : 12/019421  
DATED : December 3, 2013  
INVENTOR(S) : Krasnoiarov Page 1 of 1

It is certified that error appears in the above-identified patent and that said Letters Patent is hereby corrected as shown below:

On the Title Page

On page 2, column 2, item (56) under "Other Publications", line 2, delete "[retrived" and insert -- [retrieved --, therefor.

On page 2, column 2, item (56) under "Other Publications", line 4, delete "Mahine: Predicatable," and insert -- Machine: Predictable, --, therefor.

On page 2, column 2, item (56) under "Other Publications", line 5, delete "[retrived" and insert -- [retrieved --, therefor.

On page 2, column 2, item (56) under "Other Publications", line 10, delete "[retrived" and insert -- [retrieved --, therefor.

On page 2, column 2, item (56) under "Other Publications", line 14, delete "Retrived" and insert -- Retrieved --, therefor.

In the Drawings

On sheet 3 of 3, in figure 2A, line 8, delete "coverters" and insert -- converters --, therefor.

On sheet 3 of 3, in figure 2B, under Reference Numeral 202, line 1, delete "bytcode" and insert -- bytecode --, therefor.

Signed and Sealed this  
Third Day of June, 2014

Michelle K. Lee  
*Deputy Director of the United States Patent and Trademark Office*